US007110928B1

(12) United States Patent
Lee

(10) Patent No.: US 7,110,928 B1
(45) Date of Patent: Sep. 19, 2006

(54) APPARATUSES AND METHODS FOR MODELING SHARED BUS SYSTEMS

(75) Inventor: Douglas C. Lee, Cupertino, CA (US)

(73) Assignee: Adaptec, Inc., Milipitas, CA (US)

( * ) Notice: Subject to any disclaimer, the term of this patent is extended or adjusted under 35 U.S.C. 154(b) by 947 days.

(21) Appl. No.: 10/090,353

(22) Filed: Mar. 1, 2002

(51) Int. Cl.
G06F 17/50 (2006.01)
G06G 7/62 (2006.01)

(52) U.S. Cl. ....................................................... 703/13
(58) Field of Classification Search .................... 703/13
See application file for complete search history.

(56) References Cited

U.S. PATENT DOCUMENTS 5,825,752 A * 10/1998 Fujimori et al. ............ 370/260
6,112,278 A * 8/2000 Ellis et al. .................. 711/118

OTHER PUBLICATIONS

J. Sosnowski et al., "Monitoring Parallel Interfaces in System Enviroment", Jan. 29, 2002, IEEE Computer Society, pp. 462-465.*

Xavier Molero et al., "A Tool for the Design and Evaluation of Fibre Channel Storage Area Networks", Apr. 22, 2001, IEEE Simulation Symposium, pp. 133-140.*

* cited by examiner

Primary Examiner—Hugh Jones
(74) Attorney, Agent, or Firm—IP Strategy Group, P.C.

(57) ABSTRACT

A software-implemented shared bus system model for modeling a shared bus system that includes a plurality of devices interconnected via a shared bus. The system model includes a first device model for partially modeling a first one of the plurality of devices, the first device model including a first modified logical module and a first modified I/O-specific module. The system model further includes a sharable module having provisioned therein first shareable data. The first shareable data is shareable by the first device model and another device model of the plurality of device models. The first shareable data represents I/O-specific data associated with the first device model that is also needed by the another device model of the plurality of device models during configuration of the shared bus system model. The first shareable data further represents data that would have been provisioned within the first device model if the first device model had been configured to closely mimic the data content of the first one of the plurality of devices, the first shareable data instead being provisioned in the shareable module.

29 Claims, 3 Drawing Sheets

APPARATUSES AND METHODS FOR MODELING SHARED BUS SYSTEMS

BACKGROUND OF THE INVENTION

The present invention relates to modeling architectures for modeling electronic systems. More particularly, the present invention relates to architectures for modeling a shared-bus system comprising a plurality of electronic devices interconnected via a shared bus.

One of the more popular ways to interconnect a plurality of electronic devices is through the use of a shared bus. For example, a modern computer network employs a shared bus, such as a SCSI (Small Computer System Interface) bus, to interconnect the CPU with a plurality of devices such as printers, disk drives, scanners, and the like. In a shared bus system, each device on the bus arbitrates for and takes control of the bus whenever it needs to communicate with the CPU and/or another device.

To facilitate discussion, FIG. 1 shows a simplified illustration of a typical shared bus system. In FIG. 1, a shared bus system 100 includes a plurality of devices 102, 104, 106, and 108, which are interconnected via a shared bus 110. Through bus 110, each device may share its resources with another device by exchanging data and commands.

There are times when it may be useful to model a shared bus system, such as shared bus system 100 of FIG. 1. For example, a hardware or software developer working on a prototype device may wish to test the prototype device's interaction with various devices as well as with the shared bus of a shared bus system. Modeling permits the developer to efficiently develop a large number of test cases, each representing a particular behavioral scenario for the shared bus devices, with which the developer can test the prototype device against. Without modeling, the developer would have to physically create a multiplicity of shared bus system configurations and configure each real-world shared bus system to obtain the desired behavior against which the prototype device can be tested. Modeling allows the developer to accomplish the same goal without the expenses and time-consuming efforts of physically creating a multiplicity of real-world systems for the purpose of testing.

In the prior art, modeling engineers have typically tried to mimic as faithfully as possible each constituent part of the system to be modeled. This approach, termed the monolithic modeling approach, attempts to model each constituent device closely after its real-world counterpart. That is, the capability and behavior of each device in the system to be modeled are faithfully recreated in software so that when the various device models are put together, the assembled modeled system would mimic the behavior of its real-world counterpart as faithfully as possible. This modeling paradigm is natural since the modeling itself mimics the way the electronic devices are packaged and sold by the manufacturer, as well as bought and assembled by the user, in the real world.

FIG. 2 illustrates a resultant monolithic system model 200 for the shared bus system 100 of FIG. 1. In FIG. 2, there are shown a plurality of device models 202, 204, 206, and 208 interconnected via a shared bus 216. Each device model includes two modules: a logical module and an I/O specific module. The logic module, such as logic module 202A of device model 202, includes codes and data for modeling behaviors that are invariant with respect to the physical interface through which the device modeled by device model 202 communicates with the outside world. Thus, in a SCSI device, the logic module may contain codes and data for modeling the command handler logic, since SCSI commands are standardized irrespective of the physical interface through which the commands are transmitted. Other logical functions such as how to store and address data, how to handle reset, how to respond to status if inquired, and configuration of non-I/O specific parameters, etc., are also modeled by codes and data in the logical module. The functions performed by the reset handler includes, for example, putting the model into a known state as defined by the SCSI specification following the assertion of SCSI reset on the bus or upon initial power-up. The functions of the command handler includes, for example, processing the commands received from the initiator (e.g., SCSI host) by, for example, validating the fields of the commands and preparing them for the target to process. Configuration of non-I/O specific parameters includes the configuration of non-I/O specific parameters that affect how a device behaves (such as, for example, sense information, contingent allegiance, mode pages, inquiry data, and the like).

The I/O specific module, such as I/O specific module 202B of device model 202, includes codes and data for modeling behaviors that are dependent on the physical interface. For example, interfacing functions specific to a given SCSI implementation are modeled by codes and data in the I/O specific module. Other physical interface-dependent functions and parameters such as the timing information (e.g., communication speed, the synchronous or asynchronous nature of the communication), I/O specific reset handlers, access methods, configuration of I/O specific parameters, and the like, are modeled by codes and data within the I/O specific module. The I/O-specific reset handler resets I/O-specific parameters such as, for example, asynchronous vs. synchronous, single-ended vs. low voltage differential (LVD), narrow vs. wide, single transition vs. dual transition, packetized vs. non-packetized, maximum data transfer rate, and the like. Access methods include, for example, functions for handling asynchronous or synchronous transfer, packetized, data group, SPI-4, and the like. Configuration of I/O specific parameters includes the configuration of such I/O-specific parameters as packetized or non-packetized, quick arbitration and selection (abbreviated QAS), single transition or dual transition, and the like.

FIG. 2 also shows a timing monitor module 212, representing a module for monitoring and validating the timing of the bus cycles. These bus cycles must follow specific parameters laid out by the lower level transport mechanism and protocol in order for the system as a whole to function correctly. Thus timing monitor module 212 monitors the devices to assess, for example, whether the devices output data and commands in a timely manner and whether they respond in a timely manner.

A protocol monitor module 214 monitors transactions at a higher protocol level. For example, protocol monitor module 214 may monitor such protocol-related issues such as data field integrity, transitions between states, the specific SCSI protocol in use, whether the transfer is synchronous or asynchronous, whether the data is packetized or not, and whether dual transition is involved, and the like.

It is observed by the inventor herein, however, that the prior art paradigm of modeling a shared bus system by monolithically modeling each constituent device to faithfully replicate that device's real-world capabilities and behavior and subsequently assembling the individual device models and monitor modules into a modeled system results in inefficiencies in the configuration and management tasks. To facilitate discussion of the shortcomings of the prior art monolithic paradigm, it may be useful to briefly discuss the various tasks that need to be handled in the generation of a typical test case from such a modeled system.

In order to generate a test case from monolithic system model 200, at least two tasks must be performed: 1) configuring the system model 200, and 2) describing the actual commands or transactions that take place with the device models. In the first task, i.e., configuring the system model 200, a plurality of sub-tasks must be undertaken. FIG. 3 is a flowchart illustrating the typical sub-tasks required to configure a monolithic shared bus system model, such as monolithic system model 200.

As shown in FIG. 3, one of the sub-tasks involved in configuring a monolithic shared bus system model is specifying parameters for the device models (302). In this block 302, each device is described to its respective device model. In effect, the sub-task in block 302 represents the description of the internal specifications of a device. If the device is a disk drive connected to a SCSI bus, for example, these parameters in block 302 may include the block size, whether the data is transferred in 8-bit or 16-bit chunks, the transfer speed, the CRC (cyclic redundancy check) interval, the disconnect/reconnect behavior, and the like. These parameters in block 302 may be obtained from the manufacturer of each device or may be approximated by a general model.

In block 304, the parameters for connections between devices are specified to the connected device models. In this block 304, each device model is configured with parameters to specify what it can expect when interacting with another device on the shared bus and how it should behave toward that other device. For example, if the other device is a slower device, the device being configured may be told to communicate only at the maximum speed of the slower device when interacting with the slower device. These parameters need to be specified for each possible connection between any two device models.

In block 306, the parameters for the interactions between each device and the timing monitor module are specified to the timing monitor module. In this block 306, the timing monitor module is configured with parameters to specify what it should expect in terms of timing when interacting with each device model. Thus, the parameters involved may be, for this example, transfer speed, the specific protocol of SCSI in use (since this impacts speed), whether the transfer is synchronous or asynchronous, whether the data is packetized or not, and whether dual transition is involved. As another example, the timing monitor module may monitor set-up and hold time for the various transactions, arbitration time, connect/disconnect time of the devices, and the like. These parameters need to be specified for each possible connection between a device model and the timing monitor module.

In block 308, the parameters for interactions between devices are specified to the timing monitor module. In block 308, the timing monitor module is configured with parameters to specify what it should expect, in terms of timing, when two devices interact. This is similar to programming done in block 304, except that in block 308, these parameters are specified to the timing monitor module. For example, if the one device is a slower device, the timing monitor module may be told to expect the other device to communicate only at the maximum speed of the slower device when the faster device interacts with the slower device. These parameters need to be specified to the timing monitor module for each possible connection between any two device models.

In block 310, the parameters for interactions, at the protocol level, between each device and the protocol monitor module are specified to the protocol monitor module. In block 310, the protocol monitor module is configured with parameters to specify what it should expect, in terms of higher level protocol, when it interacts with a device. This is similar to programming done in block 306, except that in block 306, these parameters are specified at the lower level whereas in block 310, the protocol monitor module is interested in protocol-related transactions between each device and itself. For example, parameters may be configured to tell the protocol monitor module what to expect in terms of configuration and data fields, transitions between states, and the like. Other parameters relevant to protocol integrity issues, such as the specific SCSI protocol in use, such as whether the transfer is synchronous or asynchronous, whether the data is packetized or not, and whether dual transition is involved, and the like, may be specified to the protocol monitor module in block 310 as well. These parameters need to be specified to the protocol monitor module for each possible connection between a device model and itself.

In block 312, the parameters for interactions, at the protocol level, between the devices are specified to the protocol monitor module. In block 312, the protocol monitor module is configured with parameters to specify what it should expect, in terms of higher level protocol, when two devices interact. This is similar to the programming done in block 308, except that in block 308, these parameters are specified at the lower level whereas in block 312, the protocol monitor module is interested in protocol-related transactions between two devices.

As can be appreciated from the discussion above in connection with FIG. 3, the prior art monolithic system model involves many configuration steps to configure data in the various device models as well as in the timing monitor module and in the protocol monitoring module. The numerous configuration steps, some of which involve provisioning repetitive information in multiple device models and modules, disadvantageously increases the management overhead in modeling.

For example, when there are changes to a device model, the new parameters for the changed device model need to be specified in order to create the device model (block 302) and to properly specify connections between that changed device model and other device models (block 304). Some of the same parameters also need to be specified to the timing monitor module so the timing monitor module would know what to expect regarding that changed device model's behavior toward the timing monitor module (block 306) or when that changed device model interacts other device models (block 308).

Further, some of the same parameters also need to be specified to the protocol monitor module so the protocol monitor module would know what to expect regarding that changed device model's behavior toward the protocol monitor module (block 310) or when that changed device model interacts other device models (block 312). Thus, whenever the parameters for a single device model need to be changed, multiple other modules must be reconfigured beside the changed device model. Given the fact that the device models may need to be reconfigured hundreds of times in order to generate the hundreds of test cases required in a typical verification cycle for a new device, the high management overhead associated with the prior art monolithic approach to shared bus system modeling disadvantageously renders the task of generating the required suite of test cases unnecessarily complex, cumbersome, and error-prone.

Furthermore, the replication of some of the parameters of each device model in multiple locations disadvantageously takes up more memory than necessary. Additionally, since each device model stores its own parameters, each device model, the timing monitor module and the protocol monitor module must, during the configuration phase of the modeling software, make function calls to other device models in order to obtain the necessary parameters to configure communication between itself and each of the other device models. With a large number of device models, the total number of function calls can be unduly high and can unduly degrade the performance of the modeling software.

Still further, each device model is implemented, as it is required to do in the real world, with its own logic for monitoring, arbitrating, and selecting the shared bus. With multiple device models running simultaneously, multiple logic modules for performing essentially the same function are executing simultaneously, thereby further unnecessarily degrading the performance of the modeling software.

In view of the foregoing, what is desired is a new architecture for modeling a shared bus system that can accurately furnish the desired modeled behavior while avoiding the disadvantages associated with the prior art monolithic approach for system modeling.

SUMMARY OF THE INVENTION

The invention relates, in one embodiment, to a software-implemented shared bus system model for modeling a shared bus system that includes a plurality of devices interconnected via a shared bus. The system model includes a first device model for partially modeling a first one of the plurality of devices, the first device model including a first modified logical module and a first modified I/O-specific module. The system model further includes a sharable module having provisioned therein first shareable data. The first shareable data is shareable by the first device model and another device model of the plurality of device models. The first shareable data represents I/O-specific data associated with the first device model that is also needed by the another device model of the plurality of device models during configuration of the shared bus system model. The first shareable data further represents data that would have been provisioned within the first device model if the first device model had been configured to closely mimic the data content of the first one of the plurality of devices, the first shareable data instead being provisioned in the shareable module.

In another embodiment, the invention relates to a software-implemented method for creating a shared bus system model. The shared bus system model is configured to model a shared bus system comprising a shared bus and a set of devices coupled to the shared bus. The shared bus system model includes a set of device models, each of the set of device models partially models a respective one of the set of devices. The shared bus system model further includes a monitoring module that monitors bus behavior of individual ones of the set of device models, and a shareable module that is communicable with the set of device-specific models and the monitoring module. The computer-implemented method includes providing first non-I/O specific data to a first device model of the set of device models. The compute-implemented method further includes providing first shareable data to the shareable module. The first shareable data is associated with the first device. The first shareable data represents I/O-specific data associated with the first device model that is also needed by the another device model of the plurality of device models during configuration of the shared bus system model. The first shareable data further represents data that would have been provisioned within the first device model if the first device model had been configured to closely mimic the data content of the first one of the plurality of devices, the first shareable data instead being provisioned in the shareable module, wherein both the monitoring module and the first device model employ the first shareable data to configure, during configuration of the shared bus system model, the monitoring module and the first device model to appropriately model the shared bus system during execution.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

To facilitate discussion.

DETAILED DESCRIPTION OF THE PREFERRED EMBODIMENTS

Figure 1:
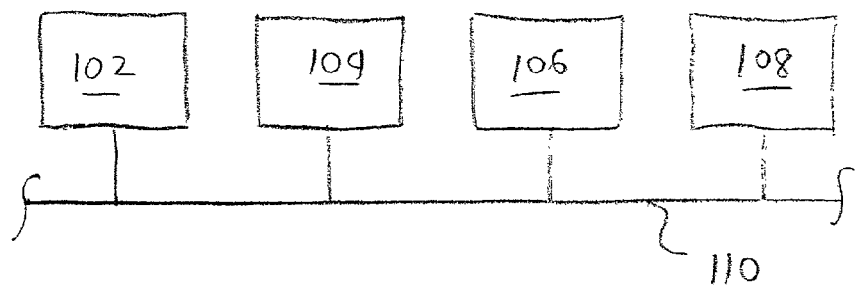
FIG. 1 shows a simplified illustration of a typical shared bus system
Figure 2:
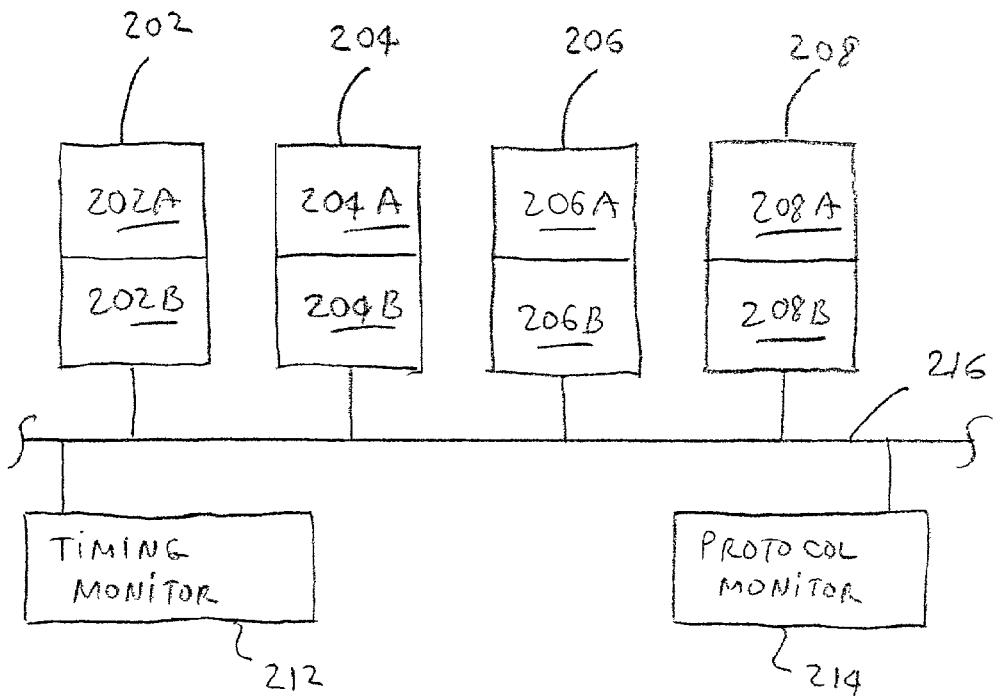
FIG. 2 illustrates a prior art monolithic system model for the shared bus system of FIG. 1.
Figure 3:
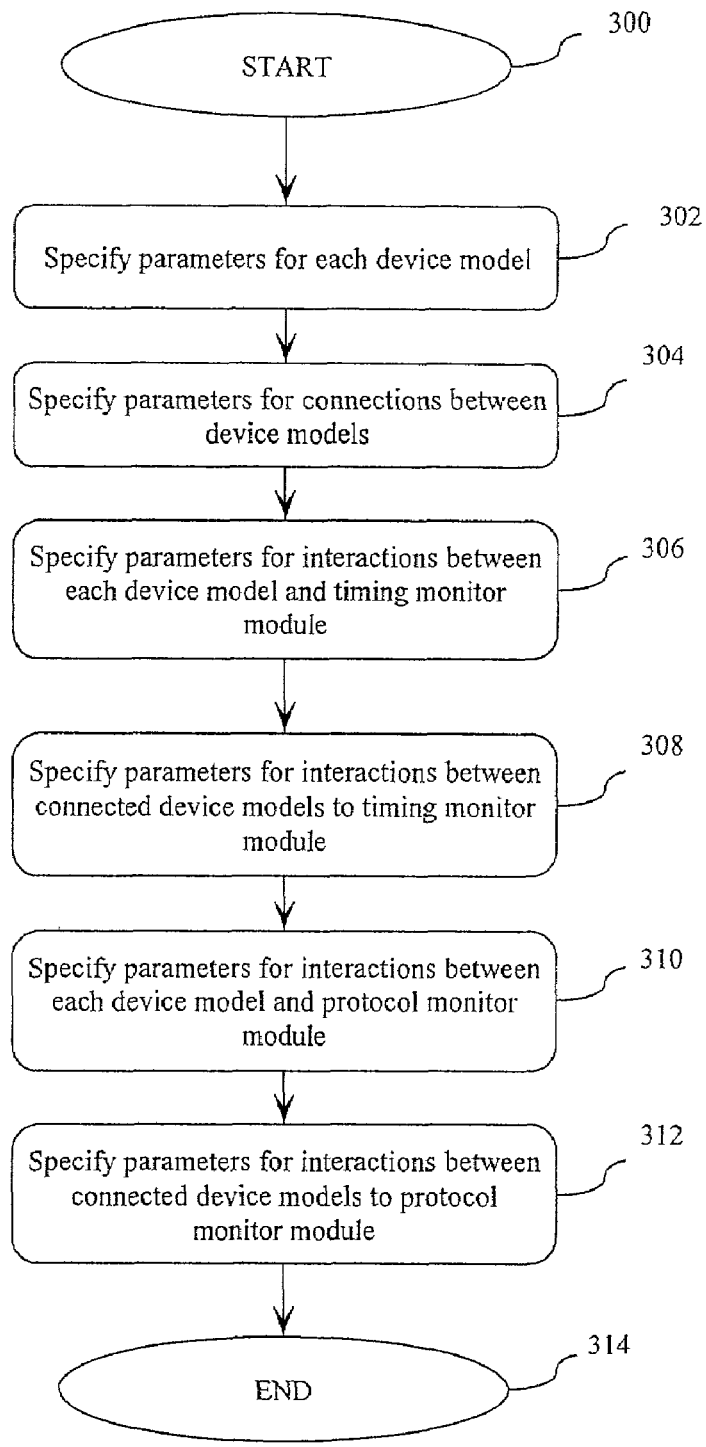
FIG. 3 is a flowchart illustrating the typical sub-tasks required to configure a monolithic shared bus system model.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there is provided an improved architecture for modeling shared bus systems. It is realized by the inventor herein that from a functional perspective, it is unnecessary and even undesirable to attempt to exactly duplicate the capabilities and data content of each real-life device in each device model of the system model. As long as the system model as a whole, when viewed from the perspective of the prototype device, can provide the appropriate responses when interacting with the prototype device, the system model would have fulfilled its required role.

Take for example the SCSI device selection procedure. When the prototype device wishes to select another device for communication, it asserts in turn a "BUSY" signal and a "SELECT" signal on the shared bus. In the real world, each device on the shared bus would monitor the shared bus to ascertain whether its own ID is present on the shared bus. If a device detects that its own ID was issued, it responds, thereby completing the selection process and facilitating the commencement of data exchange.

In the model world, as far as the prototype device is concerned, it is irrelevant whether each device model monitors for the asserted "BUSY" signal and "SELECT" signal and for its own ID, or whether this function is performed by a single shared logic module on behalf of all device models. As long as the device model is informed that it is selected so it can begin communication, it is irrelevant to the prototype device whether the monitoring of that selection signal is performed by each device model or by one shared module.

As another example, it is unnecessary and even undesirable to replicate some of the parameters pertaining to a device model among multiple modules. From the prototype model perspective, it is irrelevant where the parameters reside. As long as the various device models, the timing monitor module, and the protocol monitor module can access the parameters and configure themselves to interact appropriately with the prototype device during execution, the system model would have fulfilled its requisite role.

Thus, in accordance with one aspect of the present invention, there is provided an inventive shared bus system model and method therefor in which some of the parameters and logic functions that normally would have been provisioned within the individual device models, if the individual device models had been faithfully patterned after their real-world counterparts, are instead provided to a shareable module. The shareable module is accessible by the other device models and the monitoring modules (such as the timing monitor module and the protocol monitor module in the SCSI example). Within the shareable module, a data structure stores shareable device-specific parameters associated with the device models. In general, these device-specific parameters stored in the data structure of the shareable module pertain to interface-specific parameters.

The shareable device-specific parameters are associated in the data structure with their respective device model IDs. In this manner, the shareable device-specific parameters of each device model are stored in a single location, thereby reducing replication of data and unnecessary function calls, yet accessible to all other device models and monitoring modules for their use. Although this arrangement does not faithfully reproduce the real-world capabilities and data content of the individual devices, the system model created in accordance with this paradigm, as a whole, appears to a prototype device substantially similar to a shared bus with a plurality of devices coupled thereto and thus can be employed as any shared bus system model.

Furthermore, in accordance with one aspect of the present invention, some of the shareable logic functions normally performed by the real-world devices are performed instead by codes in the shareable module. As the term is employed herein, a shareable logic function is a logic function that is performed in more than one device model. Monitoring the shared bus for selection, as discussed above, is one such shareable function. Thus, in accordance with this aspect of the present invention, the device models that represent the real-world devices are not provisioned with codes that perform some of the requisite but shareable logic functions. Instead, the shareable codes in the shareable module perform the requisite shareable logic function and pass information to the relevant device model to enable that relevant device model to respond. Again, although this arrangement does not faithfully reproduce the real-world capabilities of the individual devices, the system model created in accordance with this paradigm, as a whole, appears to a prototype substantially similar to a shared bus with a plurality of devices coupled thereto and thus can be employed as any shared bus system model.

By grouping shareable parameters and shareable logic functions and managing them in a single location, the invention advantageously avoids the high management overhead of the prior art monolithic modeling paradigm. Further, since the shareable parameters pertaining to the device models do not need to be replicated among different modules, less memory is required and execution speed is improved. The fact that some of the shareable logic functions are performed by a single entity (i.e., the shareable module) also reduces the CPU cycles required to execute these logic functions on behalf of the various device models.

Figure 4:
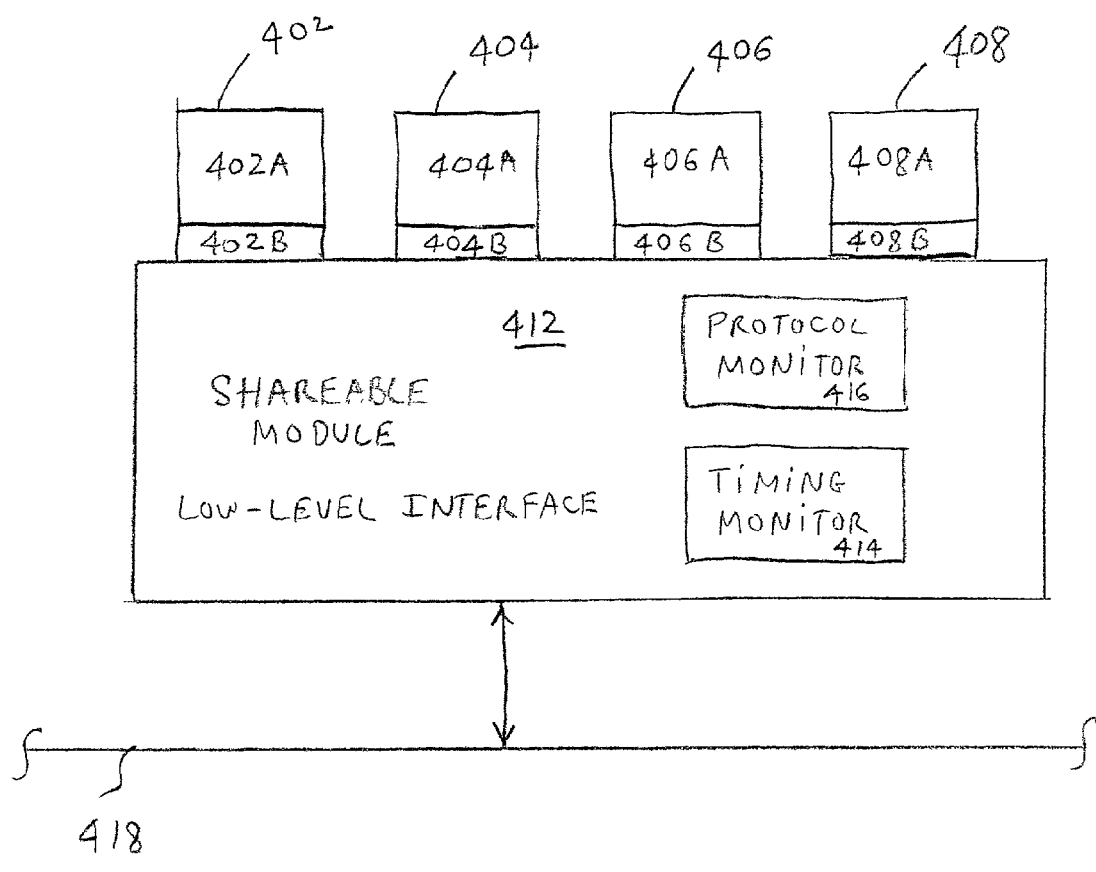
FIG. 4 illustrates, in accordance with one aspect of the present invention, an architecture for the improved shared bus system model.

The invention may be better understood with reference to FIG. 4 that follows. In FIG. 4, there are shown a plurality of device models 402, 404, 406, and 408, representing device models for partially modeling their real-world devices. The devices models of FIG. 4 only partially model their real-world devices since, as will be discussed later herein, the shareable parameters and shareable logic functions of the devices are provisioned in a data structure in a shareable module instead of being provisioned with the respective device models.

Each device model includes two modules: a modified logical module and a modified I/O specific module. The modified logical module (such as modified logical module 402A of device model 402) includes codes and data for modeling behaviors that are invariant with respect to the physical interface. The modified logic modules and modified I/O specific modules are regarded as "modified" since some of the logic codes and data, to the extent they are also required in other device models, are provisioned in the shareable module 412. Thus, the modified logical module of a device model preferably includes only codes and data specific to requirements of that device model. That is, logic codes and data that are in common with other device models or that are required by other device models for configuration and/or execution are preferably provisioned in shareable module 412 instead. Furthermore, it is preferable that the shareable logic codes, to the extent they are provisioned in shareable module 412, not be replicated in the device models. In this manner, the shareable logic codes may execute on behalf of all device models or a plurality of device models, substantially reducing the CPU cycles required to perform these logical functions.

For example, the modified logical module may include, to the extent they are non-I/O specific, reset handlers, command handlers, and configuration of non-I/O-specific parameters. The functions performed by the reset handler of the modified logical module includes, for example, the non-I/O specific reset tasks pertaining to putting the model into a known state as defined by the SCSI specification following the assertion of SCSI reset on the bus or upon initial power up. The functions of the command handler includes, for example, the non-I/O specific reset tasks pertaining to processing the commands received from the initiator (e.g., SCSI host) by, for example, validating the fields of the commands and preparing them for the target to process. Configuration of non-I/O specific parameters includes the configuration of non-I/O specific parameters that affect how a device behaves (such as, for example, sense information, contingent allegiance, mode pages, inquiry data, and the like).

Each device model may also include a modified I/O specific module. The modified I/O specific module (such as modified I/O specific module 402B of device model 402) includes codes and data for modeling behaviors that are dependent on the physical interface. However, unlike the I/O specific module of the prior art monolithically device models (such as I/O specific module 202B of prior art device model 202), the modified I/O specific module 402B of the present invention preferably only includes codes and data specific to the requirements of its respective device model. Thus, in some (but not necessarily all) device models, there may not even be a need for a modified I/O specific module.

That is, data (including device parameters) common to the shared bus and/or other device models are preferably provisioned in the database in shared module 412 instead. By way of example, the modified I/O specific module may include functions to configure I/O specific parameters and interface (such as APIs or other types of programming interfaces) to shared low level (e.g., I/O-specific) routines provisioned in the shareable module.

Furthermore, it is preferable that the shareable data/parameters, to the extent they are provisioned in shareable module 412, not be replicated in the device models. In this manner, the shareable data portion pertaining to the device models are centralized in shared module 412, substantially reducing the overhead involved in maintaining or updating such data. In general, the shareable module may include data and functions that may be utilized by more than one device model and/or monitor module. The data and functions provisioned within the shareable module may include, for example, I/O specific reset handlers, timing information, access methods, configuration of I/O specific parameters, timing monitors, protocol monitors, interface to higher level routines, and the like. Some of these functions and parameters perform substantially the same functions as those performed by their individual counterparts that are provisioned in the prior art device models. The interface to higher level routines include APIs or other programming interfaces for communicating with non-I/O specific routines. However, these I/O-specific data and functions are now, to the extent practicable, preferably centralized in the shareable module.

Further, I/O codes common to the shared bus and/or other device models are preferably provisioned in the shareable module 412 instead. Again, it is preferable that the shareable I/O codes, to the extent they are provisioned in shareable module 412, not be replicated in the device models.

Thus the inventive modeling paradigm does not seek to exactly mimic the capabilities and data content of the individual devices with the device models. Instead, a system-level view is taken, and the functions required of the modeled system as a whole, from the perspective of a prototype device interacting with the modeled system, are handled in the shareable module, the timing monitor module, the protocol module, and the individual device models.

One skilled in the art will readily recognize that some judgment may be exercised with respect to the amount of shareable codes and data to be provisioned in the shareable module 412. In general, if codes or data/parameters can be used by multiple devices and/or modules, they are eligible to be provisioned in the shareable module instead to reduce memory space utilization, CPU cycle time during configuration, execution, and/or overhead during maintenance/update. Further, some judgment may be exercised with regard to whether the shareable codes or data/parameters pertaining to a given device model, once provisioned within the shareable module, should be replicated in that device model. In some cases, the availability of local codes and/or data/parameters may help the device model to execute faster, in some cases enough to offset the increased memory utilization. Since the shareable codes and/or data/parameters are also available in the shareable module for other device models and modules (such as the timing monitor module or the protocol monitor module) to access and use already, the amount of overhead is already reduced since they do not need to be provided to all other devices and modules.

In FIG. 4, there is also shown a timing monitor module 414 and a protocol monitor module 416. In one embodiment, timing monitor module 414 and a protocol monitor module 416 are logic functions provided within the shareable module itself. The timing monitor module 414 and protocol monitor module 416 performs timing validation of bus cycles and monitoring for protocol compliance as discussed earlier. However, since they have access to the shareable codes and data/parameters in shareable module 412, they do not have to be configured with each device model's parameters as was required in the prior art.

In one embodiment, the timing monitor module 414 is provisioned with processing logic to determine, from a device model's shareable parameters that are stored in the shareable module 412, the expected timing behavior when that device model interacts with timing monitor module 414. Further, timing monitor module 414 is preferably provisioned with processing logic to determine, from the shareable parameters associated with any two device models, what their expected timing behavior should be with respect to one another when they interact. If necessary, the timing monitor module may make a call to the device model to obtain any needed data/parameters. However, the number of times such calls need to be made will be fewer with the inventive modeling architecture since some or most of the shareable data/parameters are available in the shareable module.

Likewise, in one embodiment, the protocol monitor module 416 is provisioned with processing logic to determine, from a device model's shareable parameters that are stored in the shareable module 412, the expected protocol behavior when that device model interacts with protocol monitor module 416. Further, protocol monitor module 414 is preferably provisioned with processing logic to determine, from the shareable parameters associated with any two device models, what their expected protocol behavior should be with respect to one another when they interact. If necessary, the protocol monitor module may make a call to the device model to obtain any needed data/parameters. However, the number of times such calls need to be made will be fewer with the inventive modeling architecture since some or most of the shareable data/parameters are available in the shareable module.

In FIG. 4, device models 402, 404, 406, and 408 are shown adjacent to shareable module 412 to highlight the fact that these device models may directly access the parameters and functions provisioned within shareable module 412. In the implementation of FIG. 4, the timing monitor module 414 and the protocol monitor module 416 are shown to be part of shareable module 412 to highlight the fact that functionally, these monitor modules are utilized by and interact with all device models and thus may be thought of as a shareable resource. FIG. 4 also shows a shared bus 418, representing the shared bus through which a prototype device may interact with the various device models of FIG. 4, as well as with the timing monitor 414 and the protocol monitor 416, and with bus 418 itself.

Thus, when parameters associated with a device model needs to be updated, they only need to be configured in shareable module 412 and, to the extent they are not provisioned within shareable module 412, in that device model itself. All other device models, timing monitor module 414, and protocol monitor module 416 all access the shareable parameters and can process the shareable parameters to configure themselves and/or to know the expected behavior when the newly updated device model communicates on the shared bus. There is less of a need to update the changed parameters (or a subset thereof in multiple device models, the timing monitor module, and the protocol monitor module in the manner required in the prior art monolithic system model.

To better illustrate the inventive modeling architecture, some examples are provided in Tables 1–4. Table 1 illustrates, in one implementation of the prior art modeling architecture, the parameters and/or logic functions provisioned in the logic module and I/O specific module of each device model in a generic shared bus system model.

TABLE 1

Exemplary Prior Art Modeling Architecture For A Generic Shared Bus System

| | Exemplary Parameters And/Or Logic Functions Provisioned |
|---|---|
| Table 1 Prior Art (Generic shared bus implementation) Logic Module | 1. Reset Handler. 2. Command Handlers. 3. Configuration of non-I/O specific parameters. |
| Table 1 Prior Art (Generic shared bus implementation) I/O Specific Module | 1. I/O Specific Reset Handler. 2. Timing information. 3. Access methods. 4. Configuration of I/O specific parameters. |

In contrast to Table 1, Table 2 illustrates, in accordance with one embodiment of the inventive shared bus system modeling architecture for a generic shared bus, the parameters and/or logic functions provisioned in the modified logic module and modified I/O specific module of each device model as well as the parameters and/or logic functions provisioned in the shared module.

TABLE 2

Exemplary Implementation Of Inventive Modeling Architecture For A Generic Shared Bus System

| | Exemplary Parameters And/Or Logic Functions Provisioned |
|---|---|
| Table 2 Invention (Generic shared bus implementation) Modified Logic module | 1. Reset Handler. 2. Command Handlers. 3. Configuration of non-I/O specific parameters. |
| Table 2 Invention (Generic shared bus implementation) Modified I/O Specific Module | 1. Interface to shared low level routines. 2. Configuration of I/O specific parameters. |
| Table 2 Invention (Generic shared bus implementation) Shareable Module | 1. I/O Specific Reset Handler. 2. Timing information. 3. Access methods. 4. Configuration of I/O specific parameters. 5. Timing monitors. 6. Protocol monitors. 7. Interface to higher level routines. |

Table 3 illustrates, in one implementation of the prior art modeling architecture, the parameters and/or logic functions provisioned in the logic module and I/O specific module of each device model in a SCSI-based system model.

TABLE 3

Exemplary Prior Art Modeling Architecture For A SCSI-Based System Model

| | Exemplary Parameters And/Or Logic Functions Provisioned |
|---|---|
| Table 3 Prior Art (SCSI implementation) Logic Module | 1. set_own_id 2. get_own_id 3. set_block_size 4. get_block_size 5. set_data 6. get_data 7. set_persistent_data_length 8. get_persistent_data_length 9. set_buffer 10. get_buffer 11. set_inquiry_size 12. get_inquiry_size 13. set_inquiry 14. get_inquiry 15. set_buffer_size 16. get_buffer_size 17. set_echo_buffer_size 18. get_echo_buffer_size 19. set_maximum_lun 20. get_maximum_lun 21. set_all_unit_attention 22. set_unit_attention_for_lun 23. get_unit_attention 24. set_all_sense_key 25. set_sense_key_for_lun 26. get_sense_key 27. set_unit_attention_at_reset 28. get_unit_attention_at_reset 29. set_TAS 30. get_TAS 31. reset_handler 32. add_str 33. command_handler |
| Table 3 Prior Art (SCSI implementation) Logic Module | 34. configure_standalone_str 35. inquiry_handler 36. read_handler 37. read_buffer_handler 38. request_sense_handler 39. test_unit_ready_handler 40. write_handler 41. write_buffer_handler 42. set_sense_data |
| Table 3 Prior Art (SCSI implementation) I/O Specific Module | 1. set_capabilities 2. get_capabilities 3. update_inquiry_data 4. set_spi4_assertion_qualifies_4_bytes 5. get_spi4_assertion_qualifies_4_bytes 6. configure_standalone_str 7. bus_free 8. disconnect 9. message_reject 10. send_ignore_wide_residue 11. receive_command 12. receive_message 13. send_message 14. send_status 15. async_send 16. async_receive 17. manual_async_send 18. manual_async_receive 19. manual_sync_send_data 20. manual_sync_receive_data 21. manual_data_group_send 22. manual_data_group_receive 23. manual_packet_send 24. manual_packet_receive 25. manual_spi4_packet_send 26. manual_spi4_packet_receive 27. execute_manual_phases 28. compare_bytes |

TABLE 3-continued

Exemplary Prior Art Modeling Architecture For A SCSI-Based System Model

Exemplary Parameters And/Or Logic Functions Provisioned

| | |
|---|---|
| Table 3 Prior Art (SCSI implementation) I/O Specific Module | 29. compare_words
30. compare_bits
31. req_assert
32. update_ack_count
33. ack_assert_monitor
34. get_st_data
35. put_st_data
36. req_toggle
37. ack_toggle_monitor
38. dt_receive_acks
39. get_dt_data
40. put_dt_data
41. get_dt_pad_crc
42. req_dt_pad_crc
43. send_pad_crc
44. abort_task
45. abort_task_set
46. abort_it_nexus
47. clear_task_set
48. reset_logical_unit
49. setup_timing
50. receive_data
51. send_data
52. async_send_data
53. async_receive_data
54. sync_send_data
55. sync_receive_data
56. send_data_group
57. receive_data_group
58. spi4_send_data_group
59. send_packet
60. receive_packet
61. spi4_send_packet
62. spi4_receive_packet
63. send_data_packet
64. receive_data_packet
65. receive_data_stream
66. spi4_send_data_packet
67. spi4_receive_data_packet
68. spi4_send_data_stream
69. spi4_receive_data_stream
70. wait_for_selection
71. do_reselect |
| Table 3 Prior Art (SCSI implementation) I/O Specific Module | 72. do_disconnect
73. get_command
74. send_lq_packet
75. send_lq_packet
76. receive_packetized_commands
77. receive_command_packet
78. automatic_execution_handler
79. reset_handler
80. message_handler
81. extended_message_handler
82. event_handler
83. execute_command
84. process_command
85. command_complete
86. initiate_qas
87. set_xfer_params
88. get_xfer_params
89. set_width
90. set_fairness
91. get_fairness
92. set_crc_wait
93. get_crc_wait
94. set_send_ignore_wide_residue_message
95. get_send_ignore_wide_residue_message
96. set_training_out_information_valid
97. set_data_in_skew
98. set_skew_data
99. set_lvd
100. get_lvd
101. set_width |

TABLE 3-continued

Exemplary Prior Art Modeling Architecture For A SCSI-Based System Model

Exemplary Parameters And/Or Logic Functions Provisioned

| | |
|---|---|
| | 102. get_width
103. set_data_in_skew
104. get_data_in_skew
105. set_data_out_skew
106. get_data_out_skew
107. set_xfer_params
108. assert_bsy
109. assert_sel
110. assert_atn
111. assert_req
112. assert_ack
113. assert_cd
114. assert_msg
115. assert_io
116. assert_reset |
| Table 3 Prior Art (SCSI implementation) I/O Specific Module | 117. assert_P_CRCA
118. assert_P1
119. negate_bsy
120. negate_sel
121. negate_atn
122. negate_req
123. negate_ack
124. negate_cd
125. negate_msg
126. negate_io
127. negate_reset
128. negate_P_CRCA
129. negate_P1
130. release_bsy
131. release_sel
132. release_atn
133. release_req
134. release_ack
135. release_cd
136. release_msg
137. release_io
138. release_reset
139. release_P_CRCA
140. release_P1
141. toggle_ack
142. toggle_req
143. toggle_P1
144. is_lvd
145. drive_data
146. drive_low_data
147. drive_high_data
148. release_data
149. negate_data
150. release_data_bus
151. drive_data_bit
152. assert_data_bit
153. release_data_bit
154. get_low_data_byte
155. get_high_data_byte
156. get_data |
| Table 3 Prior Art (SCSI implementation) I/O Specific Module | 157. get_P_CRCA
158. get_P1
159. get_atn
160. get_reset
161. drive_low_data_and_parity
162. drive_high_data_and_parity
163. drive_data_and_parity
164. drive_aed
165. check_low_parity
166. check_high_parity
167. check_both_parity
168. check_data_bus_for_x
169. drive_req_deskewed
170. drive_ack_deskewed
171. drive_data_deskewed_bit
172. drive_p_crca_deskewed
173. drive_p1_deskewed
174. drive_low_parity |

TABLE 3-continued

Exemplary Prior Art Modeling Architecture For A SCSI-Based System Model

Exemplary Parameters And/Or Logic Functions Provisioned

| | |
|---|---|
| | 175. drive_high_parity |
| | 176. drive_reset |
| | 177. drive_attention |
| | 178. arbitrate |
| | 179. quick_arbitrate |
| | 180. check_fairness |
| | 181. get_arbitration_winner |
| | 182. get_target_id |
| | 183. bsy_is_asserted |
| | 184. sel_is_asserted |
| | 185. reset_is_asserted |
| | 186. cd_is_asserted |
| | 187. io_is_asserted |
| | 188. msg_is_asserted |
| | 189. atn_is_asserted |
| | 190. req_is_asserted |
| | 191. ack_is_asserted |
| | 192. P_CRCA_is_asserted |
| | 193. deskewed_P_CRCA_is_asserted |
| | 194. P1_is_asserted |
| | 195. P1_is_negated |
| | 196. bsy_is_deasserted |
| Table 3 | 197. sel_is_deasserted |
| Prior Art (SCSI | 198. atn_is_deasserted |
| implementation) | 199. reset_is_deasserted |
| I/O Specific | 200. number_of_data_bits_on |
| Module | 201. is_phase |
| | 202. check_phase |
| | 203. set_phase |
| | 204. force_phase |
| | 205. get_phase |
| | 206. target_bus_free |
| | 207. initiator_bus_free |
| | 208. reselect |
| | 209. selection_response |
| | 210. reselection_response |
| | 211. select |
| | 212. reset_scsi_bus |
| | 213. validate_aed |
| | 214. wait_for_ack |
| | 215. wait_for_not_ack |
| | 216. wait_for_ack_posedge |
| | 217. wait_for_ack_negedge |
| | 218. wait_for_ack_deskewed_posedge |
| | 219. wait_for_ack_deskewed_negedge |
| | 220. wait_for_ack_change |
| | 221. wait_for_req |
| | 222. wait_for_not_req |
| | 223. wait_for_req_posedge |
| | 224. wait_for_req_negedge |
| | 225. wait_for_req_deskewed_posedge |
| | 226. wait_for_req_deskewed_negedge |
| | 227. wait_for_req_change |
| | 228. wait_for_req_deskewed_change |
| | 229. wait_for_sel |
| | 230. wait_for_not_sel |
| | 231. wait_for_bsy |
| | 232. wait_for_not_bsy |
| | 233. wait_for_bus_free |
| | 234. wait_for_data |
| | 235. wait_for_P_CRCA |
| | 236. wait_for_not_P_CRCA |
| Table 3 | 237. wait_for_P1 |
| Prior Art (SCSI | 238. wait_for_not_P1 |
| implementation) | 239. protocol_monitor |
| I/O Specific | 240. bus_phase_monitor |
| Module | 241. enable_bus_phase_monitor |
| | 242. bus_exception_monitor |
| | 243. rst_monitor |
| | 244. bsy_monitor |
| | 245. sel_monitor |
| | 246. req_monitor |
| | 247. ack_monitor |
| | 248. cd_monitor |
| | 249. io_monitor |
| | 250. msg_monitor |
| | 251. atn_monitor |
| | 252. data_bit_monitor |
| | 253. data_out_monitor |
| | 254. data_in_monitor |
| | 255. wait_for_phase_change |
| | 256. wait_for_req_or_phase_change |
| | 257. wait_for_control_change |
| | 258. wait_for_data_change |
| | 259. wait_for_parity_change |
| | 260. wait_for_data_or_parity_change |
| | 261. wait_for_any_change |
| | 262. check_min_timing |
| | 263. check_max_timing |
| | 264. bus_free_state |
| | 265. reset_state |
| | 266. arbitration_state |
| | 267. qas_arbitration_state |
| | 268. selection_state |
| | 269. message_out_state |
| | 270. message_in_state |
| | 271. command_state |
| | 272. status_state |
| | 273. st_data_in_state |
| | 274. st_data_out_state |
| | 275. dt_data_in_state |
| | 276. dt_data_out_state |
| Table 3 | 277. spi4_dt_data_in_state |
| Prior Art (SCSI | 278. spi4_dt_data_out_state |
| implementation) | 279. indeterminate_state |
| I/O Specific | 280. add_device |
| Module | 281. remove_device |
| | 282. add_event |
| | 283. broadcast_event |
| | 284. check_data_deskewed_assert |
| | 285. check_P_CRCA_deskewed_assert |
| | 286. check_P1_deskewed_assert |
| | 287. check_data_P_CRCA_deskewed_assert |
| | 288. check_data_P1_deskewed_assert |
| | 289. check_data_P_CRCA_P1_deskewed_assert |
| | 290. check_data_deskewed_negate |
| | 291. check_P_CRCA_deskewed_negate |
| | 292. check_P1_deskewed_negate |
| | 293. check_data_P_CRCA_deskewed_negate |
| | 294. check_data_P1_deskewed_negate |
| | 295. check_data_P_CRCA_P1_deskewed_negate |
| | 296. spi4_data_in_monitor |
| | 297. spi4_data_out_monitor |
| | 298. spi4_training_pattern_in_monitor |
| | 299. spi4_training_pattern_out_monitor |
| | 300. frc_ack_monitor |
| | 301. frc_req_monitor |
| | 302. wait_for_data_in_training_done |
| | 303. wait_for_data_out_training_done |
| | 304. wait_for_target_data_out_training_done |
| | 305. spi_wait_for_dt_data_in |
| | 306. spi_wait_for_dt_data_out |
| | 307. spi_get_data |

In contrast to Table 3, Table 4 illustrates, in accordance with one embodiment of the inventive shared bus system modeling architecture for a SCSI-based system model, the parameters and/or logic functions provisioned in the modified logic module and modified I/O specific module of each device model as well as the parameters and/or logic functions provisioned in the shared module.

TABLE 4

Exemplary Implementation Of Inventive Modeling Architecture For A SCSI-Based System Model

Exemplary Parameters And/Or Logic Functions Provisioned

| | |
|---|---|
| Table 4 Invention (SCSI implementation) Modified Logic Module | 1. set_own_id<br>2. get_own_id<br>3. set_block_size<br>4. get_block_size<br>5. set_data<br>6. get_data<br>7. set_persistent_data_length<br>8. get_persistent_data_length<br>9. set_buffer<br>10. get_buffer<br>11. set_inquiry_size<br>12. get_inquiry_size<br>13. set_inquiry<br>14. get_inquiry<br>15. set_buffer_size<br>16. get_buffer_size<br>17. set_echo_buffer_size<br>18. get_echo_buffer_size<br>19. set_maximum_lun<br>20. get_maximum_lun<br>21. set_all_unit_attention<br>22. set_unit_attention_for_lun<br>23. get_unit_attention<br>24. set_all_sense_key<br>25. set_sense_key_for_lun |
| Table 4 Invention (SCSI implementation) Modified Logic Module | 26. get_sense_key<br>27. set_unit_attention_at_reset<br>28. get_unit_attention_at_reset<br>29. set_TAS<br>30. get_TAS<br>31. reset_handler<br>32. add_str<br>33. command_handler<br>34. configure_standalone_str<br>35. inquiry_handler<br>36. read_handler<br>37. read_buffer_handler<br>38. request_sense_handler<br>39. test_unit_ready_handler<br>40. write_handler<br>41. write_buffer_handler<br>42. set_sense_data |
| Table 4 Invention (SCSI implementation) Modified I/O Specific Module | 1. set_capabilities<br>2. get_capabilities<br>3. update_inquiry_data<br>4. set_spi4_assertion_qualifies_4_bytes<br>5. get_spi4_assertion_qualifies_4_bytes<br>6. configure_standalone_str<br>7. bus_free<br>8. disconnect<br>9. message_reject<br>10. send_ignore_wide_residue<br>11. receive_command<br>12. receive_message<br>13. send_message<br>14. send_status<br>15. async_send<br>16. async_receive<br>17. manual_async_send<br>18. manual_async_receive<br>19. manual_sync_send_data<br>20. manual_sync_receive_data<br>21. manual_data_group_send<br>22. manual_data_group_receive<br>23. manual_packet_send<br>24. manual_packet_receive |
| Table 4 Invention (SCSI implementation) Modified I/O Specific Module | 25. manual_spi4_packet_send<br>26. manual_spi4_packet_receive<br>27. execute_manual_phases<br>28. compare_bytes<br>29. compare_words<br>30. compare_bits<br>31. req_assert<br>32. update_ack_count<br>33. ack_assert_monitor<br>34. get_st_data<br>35. put_st_data<br>36. req_toggle<br>37. ack_toggle_monitor<br>38. dt_receive_acks<br>39. get_dt_data<br>40. put_dt_data<br>41. get_dt_pad_crc<br>42. req_dt_pad_crc<br>43. send_pad_crc<br>44. abort_task<br>45. abort_task_set<br>46. abort_it_nexus<br>47. clear_task_set<br>48. reset_logical_unit<br>49. setup_timing<br>50. receive_data<br>51. send_data<br>52. async_send_data<br>53. async_receive_data<br>54. sync_send_data<br>55. sync_receive_data<br>56. send_data_group<br>57. receive_data_group<br>58. spi4_send_data_group<br>59. send_packet<br>60. receive_packet<br>61. spi4_send_packet<br>62. spi4_receive_packet<br>63. send_data_packet<br>64. receive_data_packet<br>65. receive_data_stream |
| Table 4 Invention (SCSI implementation) Modified I/O Specific Module | 66. spi4_send_data_packet<br>67. spi4_receive_data_packet<br>68 spi4_send_data_stream<br>69. spi4_receive_data_stream<br>70. wait_for_selection<br>71. do_reselect<br>72. do_disconnect<br>73. get_command<br>74. receive_lq_packet<br>75. send_lq_packet<br>76. receive_packetized_commands<br>77. receive_command_packet<br>78. automatic_execution_handler<br>79. reset_handler<br>80. message_handler<br>81. extended_message_handler<br>82. event_handler<br>83. execute_command<br>84. process_command<br>85. command_complete<br>86. initiate_qas<br>87. set_xfer_params<br>88. get_xfer_params<br>89. set_width<br>90. set_fairness<br>91. get_fairness<br>92. set_crc_wait<br>93. get_crc_wait<br>94. set_send_ignore_wide_residue_message<br>95. get_send_ignore_wide_residue_message<br>96. set_training_out_information_valid<br>97. set_data_in_skew<br>98. set_skew_data |
| Table 4 Invention (SCSI implementation) Shareable Module | 1. set_lvd<br>2. get_lvd<br>3. set_width<br>4. get_width<br>5. set_data_in_skew<br>6. get_data_in_skew |

TABLE 4-continued

Exemplary Implementation Of Inventive Modeling Architecture For A SCSI-Based System Model Exemplary Parameters And/Or Logic Functions Provisioned

|  |  |
|---|---|
| | 7. set_data_out_skew |
| | 8. get_data_out_skew |
| | 9. set_xfer_params |
| | 10. assert_bsy |
| | 11. assert_sel |
| | 12. assert_atn |
| | 13. assert_req |
| | 14. assert_ack |
| | 15. assert_cd |
| | 16. assert_msg |
| | 17. assert_io |
| | 18. assert_reset |
| | 19. assert_P_CRCA |
| | 20. assert_P1 |
| | 21. negate_bsy |
| | 22. negate_sel |
| | 23. negate_atn |
| | 24. negate_req |
| | 25. negate_ack |
| | 26. negate_cd |
| | 27. negate_msg |
| | 28. negate_io |
| | 29. negate_reset |
| | 30. negate_P_CRCA |
| | 31. negate_P1 |
| | 32. release_bsy |
| | 33. release_sel |
| | 34. release_atn |
| | 35. release_req |
| | 36. release_ack |
| | 37. release_cd |
| | 38. release_msg |
| | 39. release_io |
| | 40. release_reset |
| Table 4 | 41. release_P_CRCA |
| Invention (SCSI | 42. release_P1 |
| implementation) | 43. toggle_ack |
| Shareable Module | 44. toggle_req |
| | 45. toggle_P1 |
| | 46. is_lvd |
| | 47. drive_data |
| | 48. drive_low_data |
| | 49. drive_high_data |
| | 50. release_data |
| | 51. negate_data |
| | 52. release_data_bus |
| | 53. drive_data_bit |
| | 54. assert_data_bit |
| | 55. release_data_bit |
| | 56. get_low_data_byte |
| | 57. get_high_data_byte |
| | 58. get_data |
| | 59. get_P_CRCA |
| | 60. get_P1 |
| | 61. get_atn |
| | 62. get_reset |
| | 63. drive_low_data_and_parity |
| | 64. drive_high_data_and_parity |
| | 65. drive_data_and_parity |
| | 66. drive_aed |
| | 67. check_low_parity |
| | 68. check_high_parity |
| | 69. check_both_parity |
| | 70. check_data_bus_for_x |
| | 71. drive_req_deskewed |
| | 72. drive_ack_deskewed |
| | 73. drive_data_deskewed_bit |
| | 74. drive_p_crca_deskewed |
| | 75. drive_p1_deskewed |
| | 76. drive_low_parity |
| | 77. drive_high_parity |
| | 78. drive_reset |
| | 79. drive_attention |

TABLE 4-continued

Exemplary Implementation Of Inventive Modeling Architecture For A SCSI-Based System Model Exemplary Parameters And/Or Logic Functions Provisioned

|  |  |
|---|---|
| | 80. arbitrate |
| | 81. quick_arbitrate |
| Table 4 | 82. check_fairness |
| Invention (SCSI | 83. get_arbitration_winner |
| implementation) | 84. get_target_id |
| Shareable Module | 85. bsy_is_asserted |
| | 86. sel_is_asserted |
| | 87. reset_is_asserted |
| | 88. cd_is_asserted |
| | 89. io_is_asserted |
| | 90. msg_is_asserted |
| | 91. atn_is_asserted |
| | 92. req_is_asserted |
| | 93. ack_is_asserted |
| | 94. P_CRCA_is_asserted |
| | 95. deskewed_P_CRCA_is_asserted |
| | 96. P1_is_asserted |
| | 97. P1_is_negated |
| | 98. bsy_is_deasserted |
| | 99. sel_is_deasserted |
| | 100. atn_is_deasserted |
| | 101. reset_is_deasserted |
| | 102. number_of_data_bits_on |
| | 103. is_phase |
| | 104. check_phase |
| | 105. set_phase |
| | 106. force_phase |
| | 107. get_phase |
| | 108. target_bus_free |
| | 109. initiator_bus_free |
| | 110. reselect |
| | 111. selection_response |
| | 112. reselection_response |
| | 113. select |
| | 114. reset_scsi_bus |
| | 115. validate_aed |
| | 116. wait_for_ack |
| | 117. wait_for_not_ack |
| | 118. wait_for_ack_posedge |
| | 119. wait_for_ack_negedge |
| | 120. wait_for_ack_deskewed_posedge |
| | 121. wait_for_ack_deskewed_negedge |
| Table 4 | 122. wait_for_ack_change |
| Invention (SCSI | 123. wait_for_req |
| implementation) | 124. wait_for_not_req |
| Shareable Module | 125. wait_for_req_posedge |
| | 126. wait_for_req_negedge |
| | 127. wait_for_req_deskewed_posedge |
| | 128. wait_for_req_deskewed_negedge |
| | 129. wait_for_req_change |
| | 130. wait_for_req_deskewed_change |
| | 131. wait_for_sel |
| | 132. wait_for_not_sel |
| | 133. wait_for_bsy |
| | 134. wait_for_not_bsy |
| | 135. wait_for_bus_free |
| | 136. wait_for_data |
| | 137. wait_for_P_CRCA |
| | 138. wait_for_not_P_CRCA |
| | 139. wait_for_P1 |
| | 140. wait_for_not_P1 |
| | 141. protocol_monitor |
| | 142. bus_phase_monitor |
| | 143. enable_bus_phase_monitor |
| | 144. bus_exception_monitor |
| | 145. rst_monitor |
| | 146. bsy_monitor |
| | 147. sel_monitor |
| | 148. req_monitor |
| | 149. ack_monitor |
| | 150. cd_monitor |
| | 151. io_monitor |
| | 152. msg_monitor |

TABLE 4-continued

Exemplary Implementation Of Inventive Modeling Architecture For A SCSI-Based System Model

| | Exemplary Parameters And/Or Logic Functions Provisioned |
|---|---|
| Table 4 Invention (SCSI implementation) Shareable Module | 153. atn_monitor
154. data_bit_monitor
155. data_out_monitor
156. data_in_monitor
157. wait_for_phase_change
158. wait_for_req_or_phase_chance
159. wait_for_control_change
160. wait_for_data_change
161. wait_for_parity_change
162. wait_for_data_or_parity_change
163. wait_for_any_change
164. check_min_timing
165. check_max_timing
166. bus_free_state
167. reset_state
168. arbitration_state
169. qas_arbitration_state
170. selection_state
171. message_out_state
172. message_in_state
173. command_state
174. status_state
175. st_data_in_state
176. st_data_out_state
177. dt_data_in_state
178. dt_data_out_state
179. spi4_dt_data_in_state
180. spi4_dt_data_out_state
181. indeterminate_state
182. add_device
183. remove_device
184. add_event
185. broadcast_event
186. check_data_deskewed_assert
187. check_P_CRCA_deskewed_assert
188. check_P1_deskewed_assert
189. check_data_P_CRCA_deskewed_assert
190. check_data_P1_deskewed_assert
191. check_data_P_CRCA_P1_deskewed_assert
192. check_data_deskewed_negate
193. check_P_CRCA_deskewed_negate
194. check_P1_deskewed_negate
195. check_data_P_CRCA_deskewed_negate
196. check_data_P1_deskewed_negate
197. check_data_P_CRCA_P1_deskewed_negate
198. spi4_data_in_monitor
199. spi4_data_out_monitor
200. spi4_training_pattern_in_monitor
201. spi4_training_pattern_out_monitor |
| Table 4 Invention (SCSI implementation) Shareable Module | 202. frc_ack_monitor
203. ftc_req_monitor
204. wait_for_data_in_training_done
205. wait_for_data_out_training_done
206. wait_for_target_data_out_training_done
207. spi_wait_for_dt_data_in
208. spi_wait_for_dt_data_out
209. spi_get_data |

As mentioned earlier, the shareable module also includes logic functions that allow the shareable module to perform a logic function on behalf of multiple device models. Take for example the previously discussed function of selecting a device for communication. In the prior art, since each device model attempts to faithfully mimic the real-world capability of its respective real-world device, each device model typically monitors for the "BUSY" and "SELECT" signals, as well as the device ID asserted on the shared bus. When there are multiple devices coupled to the shared bus, as is usually the case, multiple of these logic functions execute simultaneously on behalf of their respective device models.

In accordance with one embodiment of the present invention, such a logic function, i.e., a logic function that can be performed on behalf of multiple device models, is preferably provisioned in the shareable module and executed on behalf of the multiple device models. For example, the logic function of monitoring for the "BUSY" and "SELECT" signals, as well as the device ID asserted on the shared bus can be performed by codes in the shareable module on behalf of the device models. Once codes in the shareable module determines that a given device identified by the asserted device ID has been selected by another device, it can simply notify the device being selected to enable the selected device to respond to the device making the request. Other analogous functions, including, for example, data transfer, reset, error detection, and the like, may also be provisioned in the shareable module and executed by the shareable module on behalf of the multiple device models. In this manner, the invention advantageously reduces the processing load on the CPU, leading to improved performance in terms of speed and memory usage for the modeling software.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An article of manufacture comprising a program storage medium having computer readable code embodied therein, said computer readable code being configured to implement a software-implemented shared bus system model for modeling a shared bus system that includes a plurality of devices interconnected via a shared bus, comprising:

computer readable code implementing a first device model for partially modeling a first one of said plurality of devices, said first device model including a first modified logical module and a first modified I/O-specific module;

computer readable code implementing a sharable module having provisioned therein first shareable data, said first shareable data being shareable by said first device model and another device model of said plurality of device models, said first shareable data representing I/O-specific data associated with said first device model that is also needed by said another device model of said plurality of device models during configuration of said shared bus system model, said first shareable data further representing data expected to be provisioned within said first device model that is configured to model the data content of said first one of said plurality of devices, said first shareable data instead being provisioned in said shareable module.

2. The article of manufacture of claim 1 further comprising:

computer readable code implementing a second device model for partially modeling a second one of said plurality of devices, said second device model including a second modified logical module and a second modified I/O-specific module, wherein said sharable module is provisioned with second shareable data, said second shareable data being shareable by said second device model and said another device model of said plurality of device models, said second shareable data representing I/O-specific data associated with said second device model that is also needed by said another device model of said plurality of device models during configuration of said shared bus system model, second shareable data further representing data expected to be provisioned within said second device model that is configured to model the data content of said second one of said plurality of devices, said second shareable data instead being provisioned in said shareable module.

3. The article of manufacture of claim 2 wherein said shared bus represents a SCSI (Small Computer System Interface) bus.

4. The article of manufacture of claim 2 wherein said first shareable data includes timing information specific to said first one of said plurality of devices.

5. The article of manufacture of claim 2 wherein said shareable module further includes a timing monitor module, said timing monitor module having access to said first shareable data and said second shareable data to configure, during configuration of said shared bus system model, said timing monitor module to facilitate monitoring of interactions at the timing level, during execution, among said first device model, said second device model, and said timing monitor module.

6. The article of manufacture of claim 2 wherein said shareable module further includes a protocol monitor module, said protocol monitor module having access to said first shareable data and said second shareable data to configure, during configuration of said shared bus system model, said protocol monitor module to facilitate monitoring of interactions at the protocol level, during execution, among said first device model, said second device model, and said timing monitor module.

7. The article of manufacture of claim 2 wherein said shareable module further includes shareable logic, said shareable logic representing logic functions executable on behalf of said first device model and said second device model, said shareable logic further representing a logic function expected to be provisioned within each of said first device model and said second device model that are configured to model the logic capabilities of said first one of said plurality of devices and said second one of said plurality of devices respectively, said shareable logic instead being provisioned in said shareable module.

8. The article of manufacture of claim 1 wherein shareable module further includes I/O-specific reset handlers.

9. The article of manufacture of claim 1 wherein said shareable module further includes I/O-specific access methods.

10. The article of manufacture of claim 1 wherein said shareable module further includes functions for configuration of I/O specific parameters.

11. The article of manufacture of claim 1 wherein said shareable module further includes interface to higher level routines.

12. The article of manufacture of claim 1 wherein said shared bus represents a SCSI (Small Computer System Interface) bus and wherein said shareable logic represents a bus arbitration function.

13. A software-implemented method for creating a shared bus system model, said shared bus system model being configured to model a shared bus system comprising a shared bus and a set of devices coupled to said shared bus, said shared bus system model including a set of device models, each of said set of device models partially models a respective one of said set of devices, said shared bus system model further including a monitoring module that monitors bus behavior of individual ones of said set of device models, and a shareable module that is communicable with said set of device-specific models and said monitoring module, said computer-implemented method comprising:

providing first non-I/O specific data to a first device model of said set of device models;

providing first shareable data to said shareable module, said first shareable data being associated with said first device, said first shareable data representing I/O-specific data associated with said first device model that is also needed by said another device model of said plurality of device models during configuration of said shared bus system model, said first shareable data further representing data expected to be provisioned within said first device model that is configured to model the data content of said first one of said plurality of devices, said first shareable data instead being provisioned in said shareable module, wherein both said monitoring module and said first device model employ said first shareable data to configure, during configuration of said shared bus system model, said monitoring module and said first device model to appropriately model said shared bus system during execution and, wherein said shared bus system model is configured to create said shared bus system.

14. The software-implemented method of claim 13 wherein said monitoring module includes a timing monitor module configured to monitor, at the timing level, interactions among said first device model, said timing monitor module, and at least one other device model of said plurality of device models.

15. The software-implemented method of claim 13 wherein said monitoring module includes a protocol monitor module configured to monitor, at the protocol level, interactions among said first device model, said timing monitor module, and at least one other device model of said plurality of device models.

16. The software-implemented method of claim 13 wherein said first shareable data is employed by another device model of said plurality of models to configure, during configuration of said shared bus system model, said another device model to facilitate communication between said another device model and said first device model during execution.

17. A software-implemented method for implementing a shared bus system model for modeling a shared bus system that includes a plurality of devices interconnected via a shared bus, comprising:

providing a first device model, implemented in software, for partially modeling a first one of said plurality of devices, said first device model including a first modified logical module and a first modified I/O-specific module;

providing a sharable module, implemented in software, having provisioned therein first shareable data, said first shareable data being shareable by said first device model and another device model of said plurality of device models, said first shareable data representing I/O-specific data associated with said first device model that is also needed by said another device model of said plurality of device models during configuration of said shared bus system model, said first shareable data further representing data expected to be provisioned within said first device model that is configured to model the data content of said first one of said plurality of devices, said first shareable data instead being provisioned in said shareable module.

18. The software-implemented method of claim 17 further comprising:
providing a second device model, implemented in software, for partially modeling a second one of said plurality of devices, said second device model including a second modified logical module and a second modified I/O-specific module, wherein said sharable module is provisioned with second shareable data, said second shareable data being shareable by said second device model and said another device model of said plurality of device models, said second shareable data representing I/O-specific data associated with said second device model that is also needed by said another device model of said plurality of device models during configuration of said shared bus system model, second shareable data further representing data expected to be provisioned within said second device model that is configured to model the data content of said second one of said plurality of devices, said second shareable data instead being provisioned in said shareable module.

19. The software-implemented method of claim 18 wherein said shared bus represents a SCSI (Small Computer System Interface) bus.

20. The software-implemented method of claim 18 wherein said first shareable data includes timing information specific to said first one of said plurality of devices.

21. The software-implemented method of claim 18 wherein said shareable module further includes shareable logic, said shareable logic representing logic functions executable on behalf of said first device model and said second device model, said shareable logic further representing a logic function expected to be provisioned within each of said first device model and said second device model that are configured to model the logic capabilities of said first one of said plurality of devices and said second one of said plurality of devices respectively, said shareable logic instead being provisioned in said shareable module.

22. The software-implemented method of claim 21 wherein said shared bus represents a SCSI (Small Computer System Interface) bus and wherein said shareable logic represents a bus arbitration function.

23. The software-implemented method of claim 18 further including provisioning a timing monitoring module in said shareable module, said timing monitor module having access to said first shareable data and said second shareable data to configure, during configuration of said shared bus system model, said timing monitor module to facilitate monitoring of interactions at the timing level, during execution, among said first device model, said second device model, and said timing monitor module.

24. The software-implemented method of claim 18 further including provisioning a protocol monitoring module in said shareable module, said protocol monitor module having access to said first shareable data and said second shareable data to configure, during configuration of said shared bus system model, said protocol monitor module to facilitate monitoring of interactions at the protocol level, during execution, among said first device model, said second device model, and said timing monitor module.

25. The software-implemented method of claim 24 further including provisioning a timing monitoring module in said shareable module, said timing monitor module having access to said first shareable data and said second shareable data to configure, during configuration of said shared bus system model, said timing monitor module to facilitate monitoring of interactions at the timing level, during execution, among said first device model, said second device model, and said timing monitor module.

26. The software-implemented method of claim 17 wherein shareable module further includes I/O-specific reset handlers.

27. The software-implemented method of claim 17 wherein said shareable module further includes I/O-specific access methods.

28. The software-implemented method of claim 17 wherein said shareable module further includes functions for configuration of I/O specific parameters.

29. The software-implemented method of claim 17 wherein said shareable module further includes interface to higher level routines.

* * * * *